(12) United States Patent
Larson

(10) Patent No.: US 6,742,386 B1
(45) Date of Patent: Jun. 1, 2004

(54) WHEEL MOUNTED POWER GENERATOR AND WHEEL CONDITION SENSING APPARATUS

(75) Inventor: Gerald L. Larson, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/702,151

(22) Filed: Oct. 30, 2000

(51) Int. Cl.[7] .............................................. G01M 15/00
(52) U.S. Cl. ..................................... 73/146.4; 340/447
(58) Field of Search ................................ 73/146, 146.2, 73/146.3, 146.4, 146.5, 118.1; 340/438, 442, 445, 447, 449

(56) References Cited

U.S. PATENT DOCUMENTS

| | | | | |
|---|---|---|---|---|
| 5,297,424 A | * | 3/1994 | Sackett | 73/146.5 |
| 5,381,090 A | * | 1/1995 | Adler et al. | 324/174 |
| 5,505,080 A | | 4/1996 | McGhee | |
| 5,667,606 A | | 9/1997 | Renier | |
| 5,825,286 A | * | 10/1998 | Coulthard | 340/447 |
| 5,977,870 A | | 11/1999 | Rensel et al. | |
| 6,025,777 A | | 2/2000 | Fuller et al. | |
| 6,034,596 A | | 3/2000 | Smith et al. | |
| 6,255,940 B1 | | 7/2001 | Phelan et al. | |
| 6,259,361 B1 | | 7/2001 | Robillard et al. | |
| 6,286,992 B1 | * | 9/2001 | Kyrtsos | 374/45 |
| 6,292,095 B1 | | 9/2001 | Fuller et al. | |
| 6,538,426 B1 | * | 3/2003 | Enrietto et al. | 324/174 |
| 2002/0185052 A1 | * | 12/2002 | Kelly et al. | 116/216 |

\* cited by examiner

Primary Examiner—Eric S. McCall
(74) Attorney, Agent, or Firm—Jeffrey P. Calfa; Dennis Kelly Sullivan; Susan L. Lukasik

(57) ABSTRACT

An electromechanical apparatus suitable for mounting on a vehicle wheel power for generating telemetry relating to the wheel including tire temperature and pressure. The apparatus includes a pendulum mounted to rotate freely relative to the vehicle wheel which is positioned from the wheel hub. When the wheel is set to rotation, the pendulum freely hangs from the wheel hub under the influence of an off center counterweight having sufficient inertia to prevent rotation of the pendulum with the wheel. The pendulum is used to position one or more magnets to be used to excite field coils, which are mounted with respect to the wheel hub to rotate with the wheel. The magnets and rotating coils cooperate to energize a power utilization circuit also mounted with respect to the wheel hub to rotate therewith. The utilization circuit may include such sensors as desired, typically including though a tire pressure gauge and tire and wheel hub temperature gauges. The apparatus is readily extended to incorporate a fire pressurization pump, which may be a solenoid pump powered indirectly from the rotating coils, or by a magnetic button pump.

5 Claims, 7 Drawing Sheets

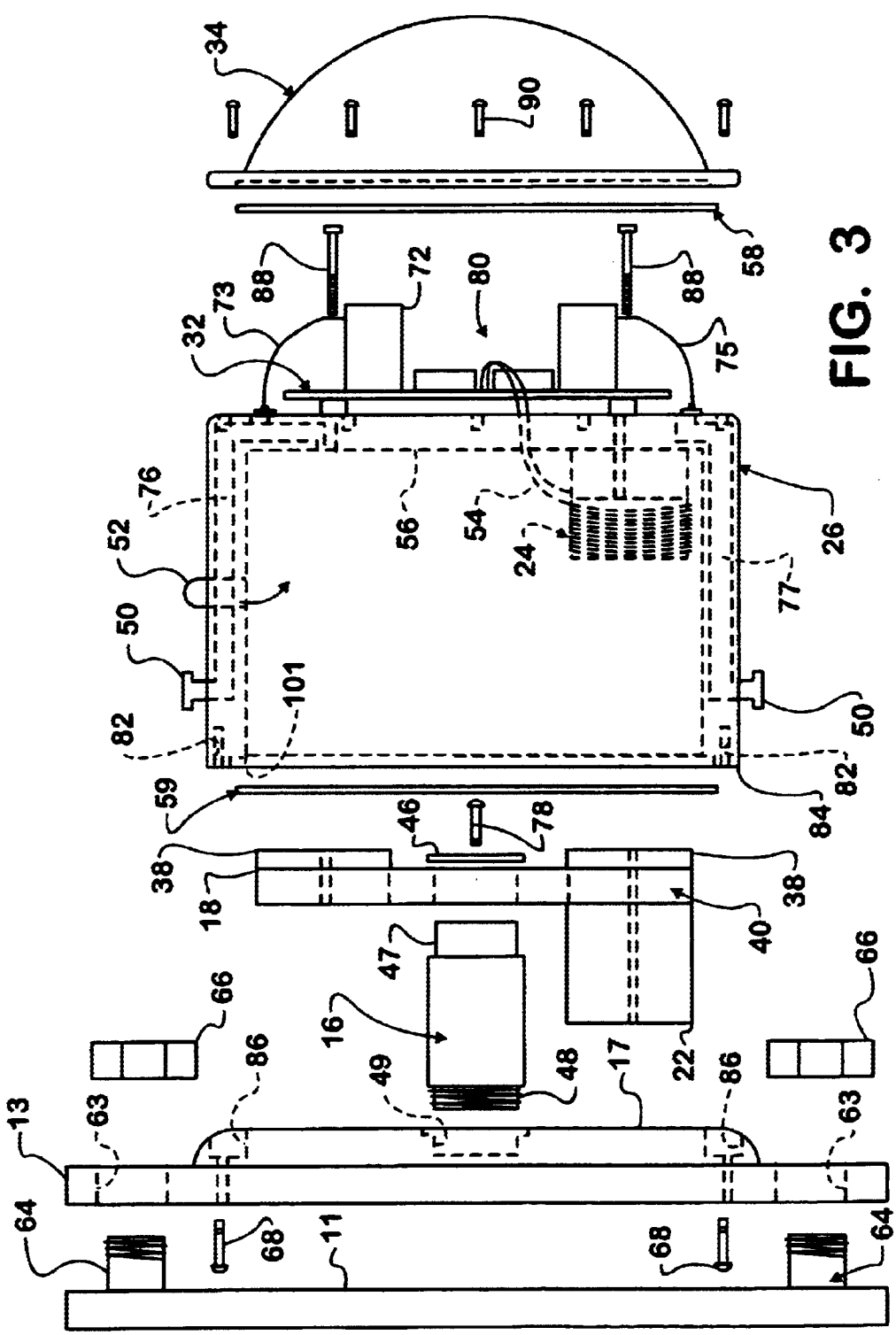

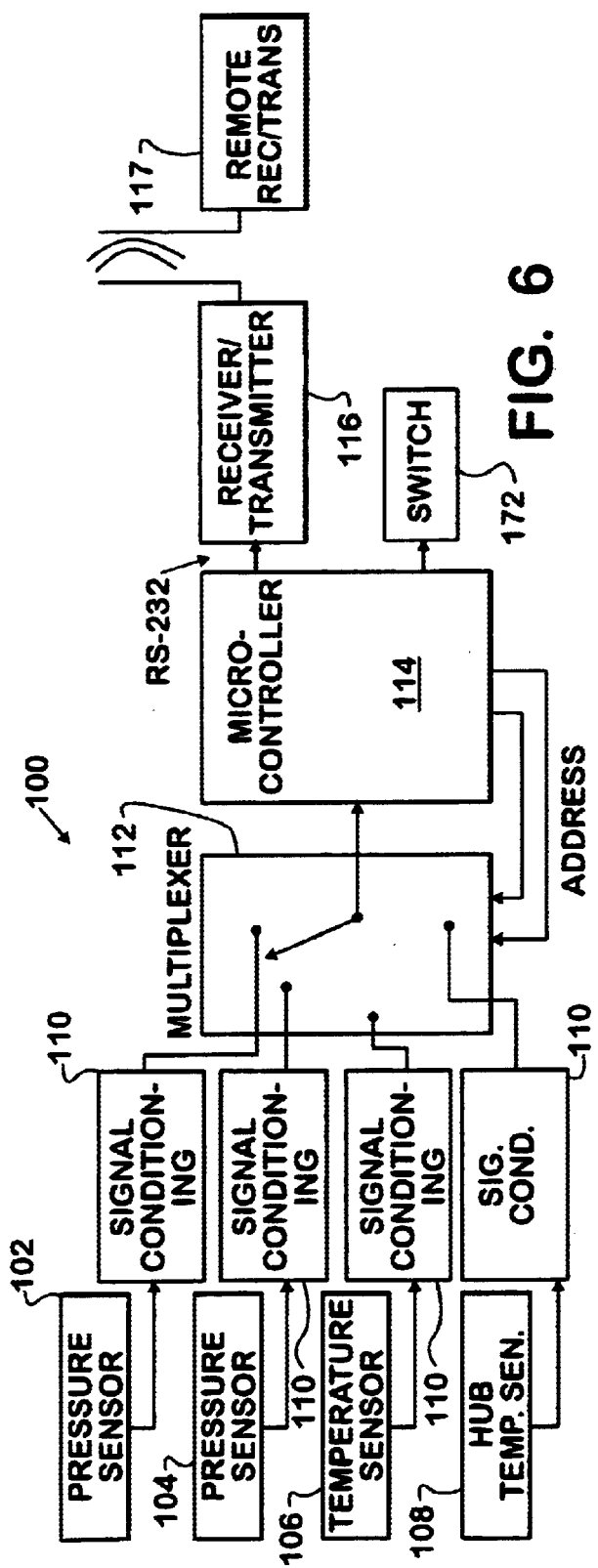
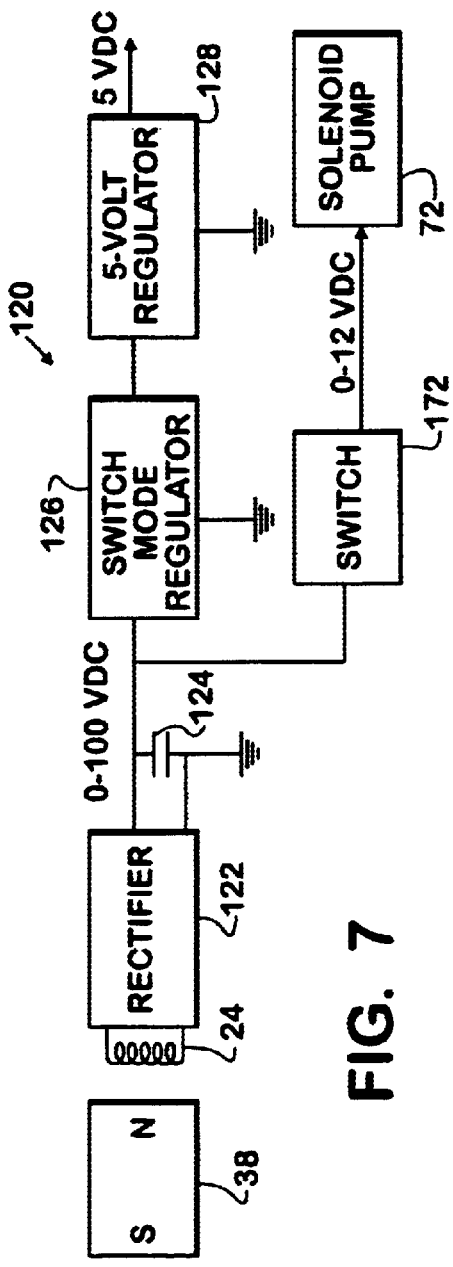
FIG. 6
FIG. 7

WHEEL MOUNTED POWER GENERATOR AND WHEEL CONDITION SENSING APPARATUS

BACKGROUND OF THE INVENTION

1. Field of the Invention

The present invention relates to vehicle and wheel assembly condition monitoring and, more particularly, to a hub mounted sensor assembly which is self energized.

2. Description of the Problem

Economical truck operation and the reduction of vehicle maintenance costs are greatly aided by keeping the vehicle in close conformance to a manufacturer's operational specifications. Of particular concern here are those specifications relating to the operating condition of the vehicle axle and tire/wheel assembly. Maintaining proper tire pressure contributes directly to optimum fuel economy and to long tire life. Low tire pressure results in tire sidewall flex which contributes to a heat buildup in the tire. Excessively high tire temperatures promote degradation of the polymers from which tires are constructed which in turn promotes excessive wear of the tire. An axle end temperature which varies above a threshold temperature may indicate the beginning of a wheel bearing problem.

Truck operators routinely check tire pressure during stops, however, the ability to monitor all of these variables, and possibly to adjust tire pressure, while the vehicle is in motion, would be advantageous. However, accessibility to points where these variables can be measured, while the vehicle is in motion, is less than optimal. Typical active sensors, such as air pressure gauges and thermometers, work best if they can be placed in close proximity to, if not direct contact with, the object to be measured. On a vehicle, this means placing air pressure sensors onto the rotating wheel. If the condition is to be monitored from the vehicle's cab, some communication device must transfer data from the sensor to a read out device in the cab. On contemporary vehicles, in which instrumentation is highly, if not completely, electronic, this usually means providing power to an electronic sender for the wheel mounted sensor and providing a transmission channel for the data back to the cab.

Wheel mounted electronic measurement and transmission system have been suggested which use batteries installed on the rotating wheels or in the vehicle tire to provide power to signal processing electronics and data transmission. Radio transmission can then be used to provide data transmission to the vehicle cab. Such a system obviously requires occasional checks on battery condition.

The prior art also provides for tire repressurization for moving vehicles. An example of such a system which can be mounted on the rotating wheel is U.S. Pat. No. 5,667,606 to Renier. The Renier device uses a pendulum which hangs freely from a rotating wheel hub. The pendulum is attached to a cam on which a cam follower, attached to a piston which rotates with the hub, rides. As the cam follower rides up on the cam it displaces the piston inwardly until the end of the cam is reached, whereupon the cam follower falls off of the cam and is displaced outwardly by a compression spring in order to begin the cycle again. The piston is the active component of a pump which provides pressurized air to a reservoir which feeds tires is under inflated. The system provides no data transmission to an electronic controller or monitoring arrangement.

A system which can provide data to a central controller can be integrated with other vehicle control arrangements, or, at a minimum, can be used to alert the driver of a vehicle of out of specification operation. In addition, an electronic system more readily provides monitoring of diverse conditions. Providing such a system on a rotatable wheel with a minimum of additional maintenance concerns remains desirable.

SUMMARY OF THE INVENTION

The invention provides an electromechanical apparatus suitable for mounting on a vehicle wheel which provides power for sensors and telemetry from sensors on a wheel, including tire temperature and pressure. The apparatus includes a pendulum mounted to rotate freely relative to the vehicle wheel positioned from the wheel hub. When the wheel is set to rotation, the pendulum freely hangs from the wheel hub under the influence of an off center counterweight having sufficient mass to prevent rotation of the pendulum with the wheel. The pendulum is used to position one or more magnets to be used to excite field coils, which are mounted with respect to the wheel hub to rotate with the wheel. The magnets and rotating coils cooperate to energize a power utilization circuit also mounted with respect to the wheel hub to rotate therewith. The utilization circuit may include such sensors as desired, typically including a tire pressure gauge and tire and wheel hub temperature gauges. Some embodiments include tire pressurization pumps, which may in turn take one of several forms including solenoid pumps powered indirectly from the rotating coils, or by magnetic button pumps.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is an exploded view of the wheel sensor assembly.

FIG. 6 is a block diagram of a power utilization circuit employed in the wheel sensor assembly of the present invention.

FIG. 7 is a block diagram of a power conditioning circuit utilized in the wheel sensor assembly of the present invention.

DETAILED DESCRIPTION OF THE INVENTION

Figure 1:
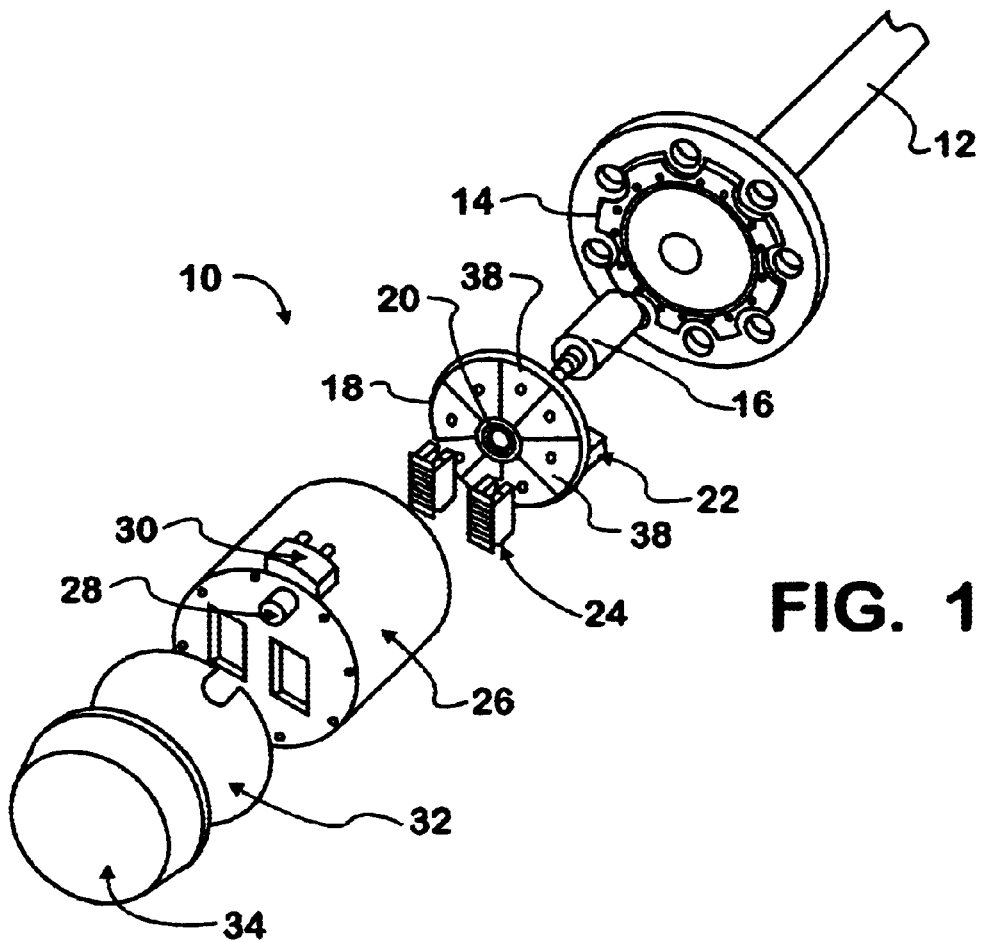
FIG. 1 is an exploded perspective view of a wheel sensor assembly in accordance with a preferred embodiment of the invention.

Referring now to the drawings and in particular to FIG. 1, a wheel sensor assembly 10 is illustrated. Wheel sensor assembly 10 is positioned at the end of a wheel axle 12, typically found on a medium or heavy duty truck, and may be used to provide data relating to the operating condition of the axle end and for tires (not shown) mounted on wheels (not shown) depending from the axle 12. Wheel sensor assembly 10 is directed to placing low maintenance energization components, power regulating and signal gathering, conditioning and transmitting circuitry into rotation with the wheels to avoid any need for direct mechanical or electrical connections between the vehicle and the sensor components.

Wheel sensor assembly 10 is positioned on a backing plate 14, which in turn is mounted on axle 12. Mounting plate 14 is mounted for rotation on axle 12. Backing plate 14 is generally disk shaped and provides points of attachment for a housing 26 of the wheel sensor assembly 10. Housing 26 rotates with the adjacent wheel of the vehicle. A shaft 16 extends outwardly from backing plate 14 relative to axle 12. Shaft 16 mates with a bearing 20 which is positioned in the center of the disk shaped magnetic plate 18. Magnetic plate 18 is set to rotate freely on shaft 16, but tends to keep a fixed rotational position relative to axle 12 under the influence of a relatively substantial inertial mass provide by an off center weight or pendant 22, attached to a face of the plate facing backing plate 14. A plurality of magnets 38 form the other major face of the disk shaped magnetic plate 14. Magnets 38 are flattened, pie section shaped pieces which, when fitted together form a disk facing substantially covering the outer portion of one major surface of magnetic plate 18.

Housing 26 is positioned on backing plate 14 to enclose magnetic plate 18 and a pair of field coils 24 wound on laminate substrate. Field coils 24 are mounted within housing 26 to rotate with the housing and the backing plate. Housing 26 further provides a attachment position for a printed circuit board 32, and a cap or cover 34 enclosing the circuit board. An air pressure sensor 28 and air pressure inlet connection point 30 may also be positioned on the exterior shell of housing 26.

Figure 2:
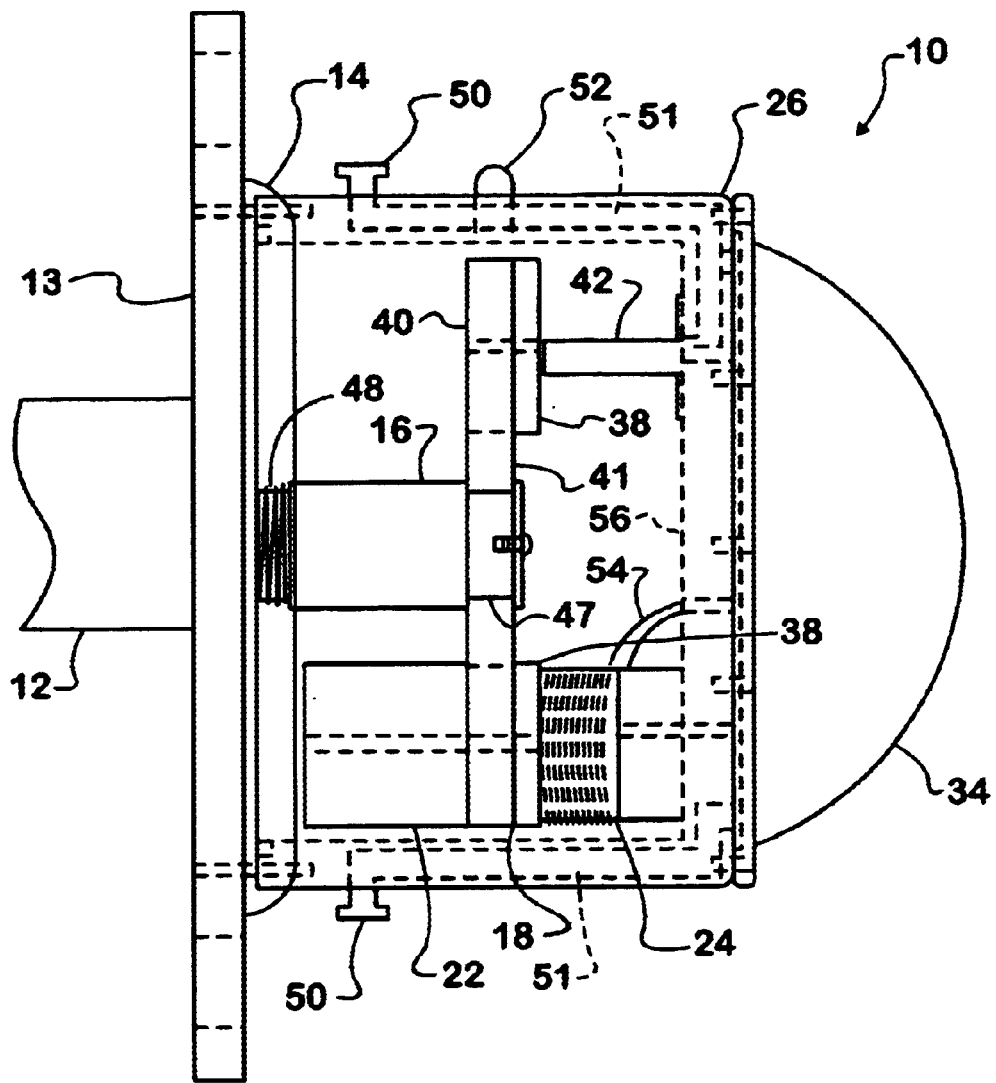
FIG. 2 is a side view in partial cross section of the wheel sensor assembly.
Figure 4B:
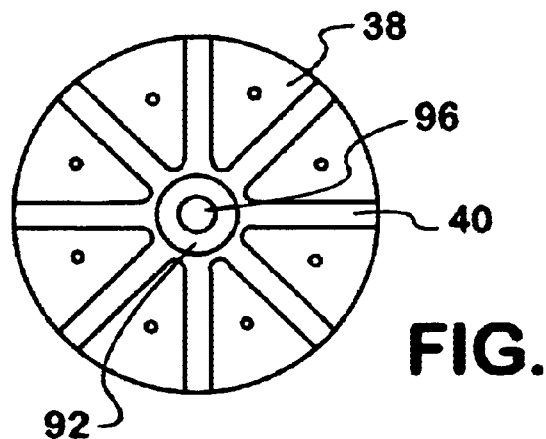
FIGS. 4A–B are views of a magnetic element used in the wheel sensor assembly.
Figure 4A:
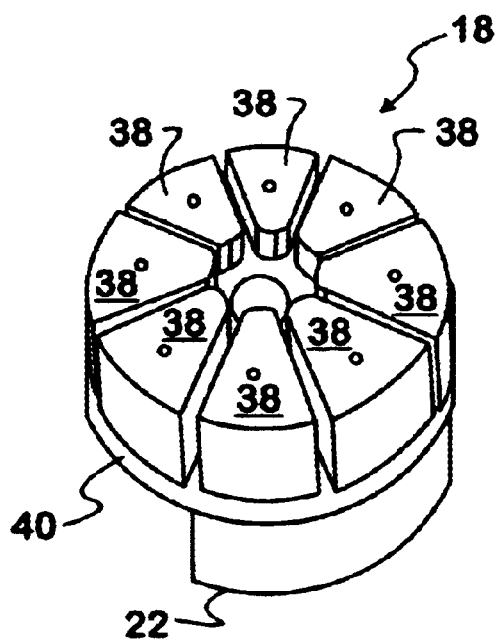
Figure 5A:
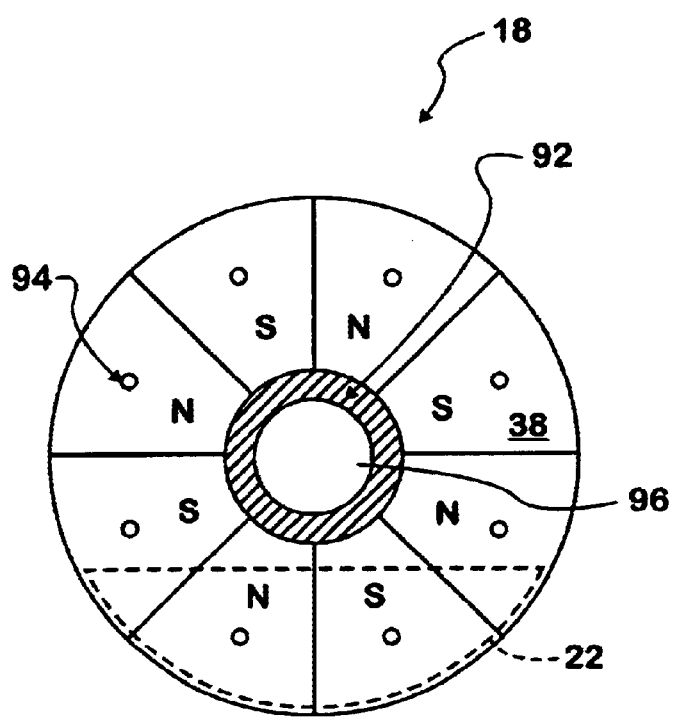
FIGS. 5A–B are detailed views of the magnetic element of FIGS. 4A–B.
Figure 5B:
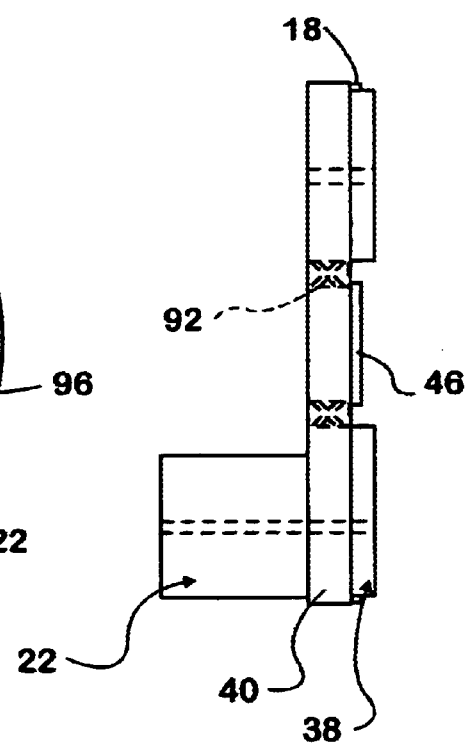

Referring now FIGS. 2–3, backing plate 14 is mounted on one side of an axle end plate 13 facing away from an end to end axle 12. Housing 26 is mounted along rim 84 in a circular recess 86 on the outward face of backing plate 14, and encloses a volume in which shaft 16, magnetic plate 18 and field coils 24 are enclosed. Wheel sensor assembly 10 is illustrated as assembled on backing plate 14. Shaft 16 has a threaded male end 48 which is screwed into a cooperatively threaded receiving bore 49 in back support plate 14 to position the shaft, centered in the exposed major surface and extending perpendicularly from the surface. The opposite end of shaft 16 is a reduced diameter section 47 which mates with a shaft bore 96 defined by bearing 92 (shown in FIG. 5A), which is centered in magnet mounting plate 40.

One or more magnets 38 may be placed on an outward face 41 of magnet mounting plate 40. A magnet 38 and field coil 24, when rotated to bring it adjacent the magnet, should be spaced by gap set to minimize flux leakage without risk of contact between the coil and the magnet. A off center counterweight or pendant 22 is attached to the face of magnet support plate oppositely faced from the face 41. Pendant 22 tends to bring magnetic plate 18 to a substantially fixed rotational position relative to axle 12 with the pendant below and vertically aligned by gravity with the axis of rotation of plate 18. Field coil 24 is mounted to the interior face of wall 54 which defines the shell of housing 26. Where the sensor assembly also provides tire inflation, a magnetic button pump 42 may also be mounted on the interior surface of wall 56. Magnetic button pump 42 is described in greater detail below. A pair of wires 54 is connected between field coil 24 and a printed circuit board 32 which is housed within cover 34. A breather valve 52 allows air to be admitted from exterior of housing 26 via a channel through wall 56 to the interior of housing 26. Tire pressurization valves 50 are also connected by channels 51 running through the interior of housing 26 between pumps, such as pump 42 or solenoid pumps (shown below).

In the exploded view, it may be seen that axle shaft end 11 provides a foundation for mounting backing plate 14. Backing plate 14 comprises two generally disk shaped elements, an larger base plate 13 adapted to provide an interface between the axle shaft end 11 and a mating disk 17 which provides attachment points for housing 26 and shaft 16. Base plate 13 attaches to axle shaft end 11 along a plurality of bolts 64 extended outwardly from the axle shaft end. Bolts 64 are inserted into holes 63 through base plate 13 and the base plate is then secured to axle shaft end 11 by the attachment of nuts 66 to bolts 64.

Prior to positioning base plate 13 on axle shaft end 11, a mating disk 17 is attached to the outwardly oriented face (i.e. the face oriented away from axle shaft end 11) of base plate 13 by a plurality of screws 68 inserted into base plate 13 and mating disk 17 from the inwardly oriented face of foundation disk 13 toward the outwardly oriented face. The backing plate 14 formed by the assembly of the base plate 13 and the mating plate 17 then is assembled as a group onto axle shaft end 11.

Magnetic plate shaft 16 is screwed at its threaded end 48 into a cooperatively threaded hole 49 in mating disk 17. The opposite end of shaft 16 is a reduced radius end 47 onto which a magnet mounting plate 40 of magnetic plate 18 is positioned. Mounting plate 40 is retained on shaft 16 by a washer 46, which is placed over end 47 and an opening through plate 40. A screw 78 is then placed through the washer and into shaft 47 to pin magnetic plate 40 on shaft 16. As described below, magnetic plate 40 incorporates a bearing allowing magnetic plate 40 to freely rotate on reduced end 47 of shaft 16.

Housing 26 encloses magnetic plate 18 and magnetic plate shaft 16 upon positioning of the circumferential rim 84 defining an edge to housing 26 into a circular channel 86 in the outer face of mating disk 17. A notch 101 is situated along the interior edge of the rim. Notch 101 provides a nesting spot for an O-ring 59 which is pressed between the faces of the notch and the interior edge of circular channel 86 to seal housing 26 against mating disk 17. Screws 68, inserted from inward face of base plate 13, through the base plate and mating disk 17 into receiving holes 82 at the bottom of the circumferential rim 84 lock the housing 26 onto the backing plate 14. Counterweight 22, which is fixed to the inward face of magnet support plate 40, pulls the plate to a rotational position with the counterweight or pendant vertically below shaft 16. Backing plate 14 and shaft 16 will rotate when a wheel mounted to axle shaft end 11 rotates. Under the influence, and inertia, of the mass of counterweight 22, magnetic plate 18 does not turn with the wheel, but remains substantially stationary with the counterweight below the (turning) shaft 16.

A printed circuit board 32 is affixed to the outward oriented shell top of housing 26. Bolts 88 are mounted through the circuit board 32 into wall 56 of housing 26 to retain the circuit board on the housing. Various circuit components 80 and electro-mechanical components, including solenoid pump 72 are mounted onto one face of circuit board 32 in a conventional manner. Solenoid pump 72 (if used) delivers pressurized air to tire pressure valves 50 along air lines 73 and 75 to channels 76 and 77, respectively. Other types of pumps may be used, such as a magnetic button pump mentioned above.

Circuit board was closed within a Lexan cover 34 which fits over the circuit board and mates with the outward wall section of housing 26. An O-ring 58, fitted between the cover and the housing, seals the cover against the housing 26. A plurality of screws 90 fitted through a rim to the cover 34 into housing 26 retain the cover against the housing.

Referring now to FIGS. 4A–B and FIGS. 5A–B, magnetic plate 18 is described in greater detail. Magnetic plate 18 is constructed on a magnet support plate 40, which is a flattened disk shaped member with a hole 96 centered on the axis of symmetry of the disk which passes through the disk from major surface to major surface. In a preferred embodiment, eight flattened, pie section shaped magnets 38 are disposed on one face of magnet support plate 40. Magnets 38 are arranged circumferentially around the perimeter of the major surface of the magnet support plate 40 and may be affixed thereto by gluing, or fasteners fitted through holes 94. Magnets 38 are oriented to present a pole on their exposed surfaces oriented away from the magnet support plate 40. The poles alternate in polarity, so that as they pass by a field coil 24 potentials of alternating polarity are produced on the coil.

Hole 96 is lined with an antifriction bearing 92 which fits around narrowed end 47 of shaft 16. Magnet support plate 40 freely rotates on bearing 92. The exterior of bearing 92 provides a support for a washer 46 used in retaining magnetic plate 18 on shaft 16. Pendant, or counterweight 22, is positioned on the opposite major surface of magnet support plate 40 as magnets 38. Counterweight 22 must be sufficiently massive to prevent magnetic coupling between one of magnets 38 and a magnet piston from a magnetic button pump resulting in the magnetic plate 18 rotating with housing 26.

FIG. 6 illustrates a power utilization circuit 100 which provides for the collection, conditioning and transmission of data from sensors. Separate pressure sensors 102, 104 are provided for each tire (not shown). A temperature sensor 106 may be placed in communication with the air within the tires to provide an indication of tire temperature. A hub temperature sensor 108, based on an air temperature sensor within housing 26 or within cover 34, may be provided. Conventional amplification and digital to analog conversion circuitry (signal conditioning circuits) 110 is provided for each signal.

The signals from each of the conditioning circuits 110 is routed through a multiplexer 112 under the control of a microcontroller 114, which can select which signal to pass to a transmitter 116 for broadcast to a remote receiver 117 located elsewhere on a vehicle. In some embodiments transmitter 116 may be replaced with a transceiver as a CAN (controller area network) remote receiver 117. In such cases remote commands such as to began inflation of a tire may be returned to microcontroller 114. Microcontroller 114 may control actuation of a switch 172 which in time controls powering a solenoid pump 72. Such signals commanding increased pressurization may come upon indication from other sources that the vehicle is carrying an especially heavy load.

FIG. 7 illustrates the power supply circuitry 120 used to power the utilization circuitry 100 and the solenoid pump 72, if used. A field coil 24 is connected to a conventional rectifier 122 and filter 124 arrangement to supply voltage at a selectable level to a switching regulator 126. Since power is rectified and filtered, the utilization circuitry remains energized regardless of the direction of movement of the vehicle. Switching regulator 126 supplies power to a 5-volt regulator 128, which in turn powers the components of the utilization circuitry 100. A solenoid pump 72 receives power from capacitor 124 when switch 172 closes.

Figure 8B:
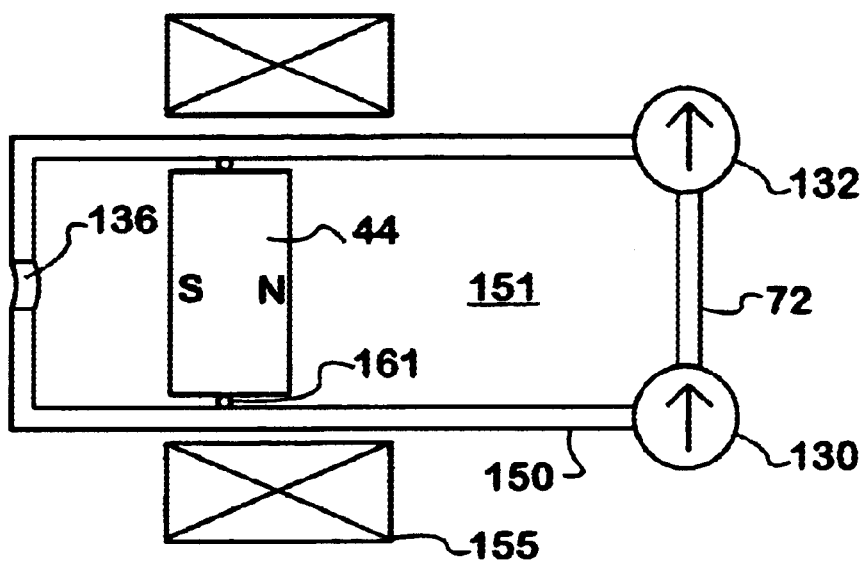
FIGS. 8A–B are a schematic illustration of an air pump used in one embodiment of the present invention.
Figure 8A:
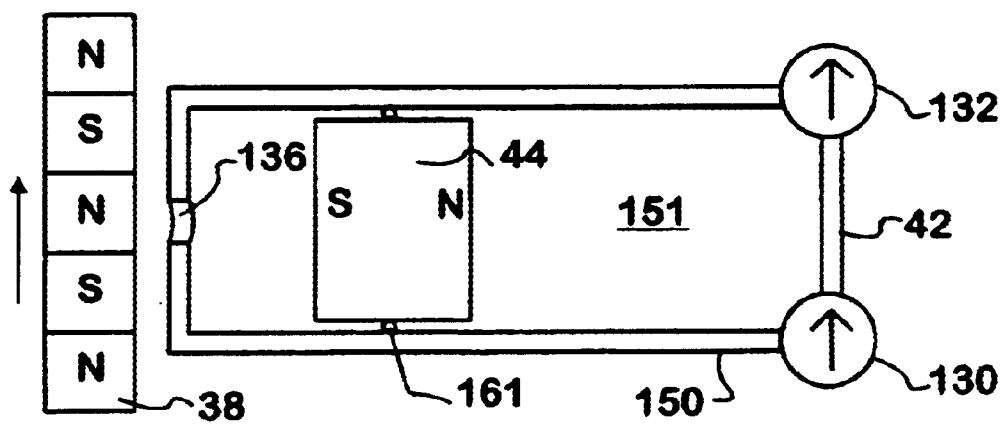

FIGS. 8A–B illustrate two pumps usable with the invention. Magnetic button pump 42 may be used instead of solenoid pumps, reducing power demands on the power supply circuitry 120. Magnetic button pump 42 comprises a magnetic button piston 44 retained for linear reciprocation in a cylinder 150. A diaphragm 161 seals the piston 44 against the interior wall of cylinder 150. Magnetic button piston 44 is retained within cylinder 150 by a lip positioned at one end of cylinder 150. An opening 136 allows air to freely move into and out of the portion of cylinder 150 between piston 44 and the opening. Piston 44 reciprocates under the influence of magnetic poles of alternating polarity of magnets 38 passing close over opening 136. As piston 44 is drawn toward opening 136, air is pulled into cavity 151 through a one way check valve 130. As piston is pushed away from opening 136 air is forced under pressure through an outlet provided by a one way check valve 132.

Figure 9:
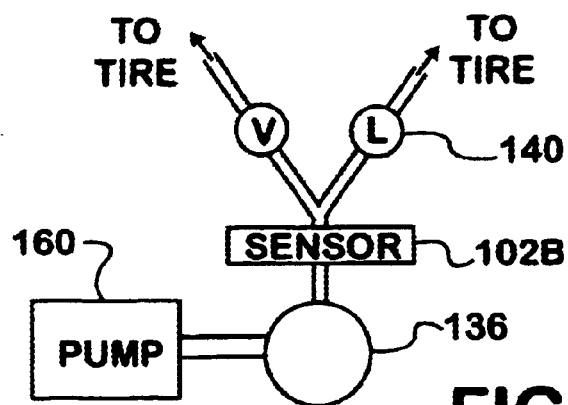
FIG. 9 is a schematic illustration of an air transfer circuit used to deliver pressurized air to tires mounted on a wheel.

Solenoid pump 72 is constructed similarly to button pump 42. However, instead of magnets 38 providing reciprocation of piston 44, a solenoid 155 wrapped on cylinder 150 effects movement of magnetic piston 44. Indeed, in a solenoid pump piston 44 may be umagnetized iron. FIG. 9 illustrates a pressurization circuit usable with either type of pump. A pump 160 provides air under pressure to a Schrader valve 136, to which tubing connecting the sensor assembly 10 to the tires may be provided. As illustrated a single pressure sensor 102B, positioned in the circuit between the Schrader valve and a Y-connection splitting the delivery of air to the two tires, indicates back pressure in the system when air is delivered. A pressure sensor or situated here displays data which in effect is an average of the pressures in the two tires. Alternatively, separate sensors may be placed in each circuit downstream from check valves 140, which prevent over pressurization of the tires.

The invention provides a sensor system which can be powered without use of a battery or direct external connection while mounted on a rotating wheel hub. The system returns data to a central controller and can be integrated with other vehicle control arrangements. Alternatively, a minimum system can be deployed to alert the driver of a vehicle of out of specification operation.

While the invention is shown in only one of its forms, it is not thus limited but is susceptible to various changes and modifications without departing from the spirit and scope of the invention.

What is claimed is:

1. An apparatus for monitoring physical variables of a tire and an axle, the apparatus comprising:
    (a) a vehicle wheel having a hub mounted for rotation on the axle, the tire being mounted thereon;
    (b) a tire pressure gauge mounted on the vehicle wheel in communication with the tire;
    (c) a tire temperature gauge mounted on the vehicle wheel adjacent the tire;
    (d) an axle temperature gauge mounted on the vehicle wheel adjacent the wheel hub;
    (e) a signal processor and transmitter mounted on the vehicle wheel and connected to the tire pressure gauge, the tire temperature gauge and the axle temperature gauge for collecting data from the gauge and broadcasting a radio signal comprehending values representing the data; and (f) an energization assembly including a magnetic element mounted adjacent the vehicle wheel presenting at least one magnetic pole parallel to the vehicle wheel's axis of rotation, a field coil mounted on the vehicle wheel to pass the magnetic pole periodically to induce excitation therein, and electrical filtering and supply circuitry connected to the field coil and to the signal processor and transmitter.

2. An apparatus as claimed in claim 1, wherein the magnetic element further comprises a positioning segment depending from the wheel hub and a stabilizing element for resisting rotation of the positioning segment with the vehicle wheel.

3. An apparatus as claimed in claim 2, wherein the positioning segment includes a mounting plate centered on the axis of rotation of the vehicle wheel; a low friction bearing centering the mounting plate on the hub.

4. An apparatus as claimed in claim 3, wherein the stabilizing element includes an off center weight attached to the mounting plate providing inertial resistance to rotation of the mounting plate.

5. An apparatus as claimed in claim 4, wherein the magnetic element comprises:

(a) the mounting plate being a disk mounted to have major opposed surfaces perpendicular to the axis of rotation of the vehicle wheel; and (b) a plurality of magnets shaped as wedges and arranged circumferentially around the outer edge of the major surface of the disk closer to the vehicle wheel with their poles oriented to alternate with adjacent magnets.

* * * * *